United States Patent
Ostler et al.

(10) Patent No.: US 6,820,193 B1
(45) Date of Patent: Nov. 16, 2004

(54) BRANCH INSTRUCTIONS WITH DECOUPLED CONDITION AND ADDRESS

(75) Inventors: Farrell L. Ostler, Albuquerque, NM (US); Antoine Farid Dagher, Albuquerque, NM (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/466,405

(22) Filed: Dec. 17, 1999

(51) Int. Cl.[7] .............................................. G06F 9/44
(52) U.S. Cl. ..................................... 712/234; 712/219
(58) Field of Search ............................... 712/219, 207, 712/233–242

(56) References Cited

U.S. PATENT DOCUMENTS

| | | | | |
|---|---|---|---|---|
| 3,577,189 A | * | 5/1971 | Cocke et al. | 712/219 |
| 5,664,135 A | * | 9/1997 | Schlansker et al. | 712/201 |
| 5,857,104 A | * | 1/1999 | Natarjan et al. | 717/158 |
| 5,961,637 A | * | 10/1999 | Sturges et al. | 712/207 |

FOREIGN PATENT DOCUMENTS

EP 0365188 A2 4/1990 ............. G06F/9/38

OTHER PUBLICATIONS

"Reducing the Cost of Branches by Using Registers", by Davidson et al, IEEE 1990.

* cited by examiner

*Primary Examiner*—Eddie Chan
*Assistant Examiner*—Tonia L. Meonske
(74) *Attorney, Agent, or Firm*—Michael J. Ure

(57) ABSTRACT

A processor architecture supports the decoupling of parameters typically associated with branch/jump instructions. Jump instructions are provided that do not contain an explicit destination address and other jump instructions are provided that do not contain an explicit test condition. The processing system provides a "default" value to any control element in the processor that is not expressly controlled by a particular instruction. In the case of a branch or call instruction, the default destination-address provided to effect the branch or call is the destination-address provided by a prior instruction. Subsequent or alternative branch or call instructions branch to this same address until the default address is set to a different address. In like manner, in most cases, the default condition that is used to determine the result of a conditional test, such as a conditional branch, call, or return instruction, is the last condition specified in a prior instruction.

14 Claims, 2 Drawing Sheets

BRANCH INSTRUCTIONS WITH DECOUPLED CONDITION AND ADDRESS

BACKGROUND OF THE INVENTION

1. Field of the Invention

This invention relates to the field of computer systems, and in particular to processor instruction sets.

2. Description of Related Art

Computer systems utilize "branch" instructions to control program flow. In a conventional computer system comprising a processor and a memory that contains program instructions, the processor executes each program instruction in the memory in sequential order, one instruction at a time. A branch instruction is used to execute program instructions that are located at a specified location in memory, thereby altering the default execution of instructions at sequential memory locations. A conditional branch is used to either continue to process the instructions in sequential order, or to branch to a specified location in memory, depending upon a given condition. The condition is tested, and if the condition is true, the computer processor continues execution at a specified address, otherwise, the processor continues execution at the next sequential location.

Other flow-of-control instructions are also available in most computer systems, such as a subroutine or function "call" and a corresponding "return". (For ease of reference, a function is considered hereinafter as a subset of a subroutine). As in a branch instruction, a subroutine "call" is used to execute program instructions that are located at a specified location. In contrast to the branch instruction, a call instruction also causes the processor to store the address of the next sequential instruction after the location of the call instruction (the "return address"). In this manner, a corresponding subroutine "return" instruction will cause the processor to continue execution at the stored return address. Conditional call and return instructions operate similar to the above referenced conditional branch instruction.

The conventional branch and call instructions include two items: an operation-code (op-code) that identifies the instruction as a branch or call instruction, and the address at which the next instruction is located. A conventional return instruction, on the other hand, only includes the operation code. The conventional conditional branch, call, and return instructions are similar to the unconditional branch, call, and return instructions, except that alternative op-codes are used to identify the alternative condition(s) that are used to determine whether to branch to a destination-address or to continue with the next sequential instruction after the conditional instruction.

Typically, an application program contains many branches and subroutine calls, and often branches and subroutine calls to the same destination address are used repeatedly. For example, a "select-case" programming construct allows different segments of program instructions to be executed, depending upon a value of a given parameter, such as a "filing-status" parameter (single, married filing jointly, married filing individually, etc.) in an income tax preparation application program. Within each different segment of the program corresponding to the value of the given parameter, the same subroutines may be called, albeit with different determined arguments, or with a different combination or order of subroutines, or with a different set of conditions, and so on. Because each conventional branch or call command requires the inclusion of the destination-address, a significant amount of address redundancy exists in a typical program. Subroutine return instructions do not incur this address redundancy penalty, but are limited in use to causing a return from a subroutine call.

The evaluation of conditional instructions in a-typical program application can also be problematic. A typical processor includes a set of "flags", and a conditional instruction effects an operation, such as a branch, return, or call, in dependence upon the state of one or more of these flags. Different instructions affect the state of different flags. For example, some instructions affect all flags, some instructions affect no flags, other instructions affect select flags, and so on. A common programming "bug" occurs when a change is made to a program that uses an instruction that affects flags, without an exhaustive assessment of the effects that a potential change in the state of each flag will cause. Because the added instruction may result in the same flag state as the intended flag-setting instruction, this error may not be immediately detected, and the effects of the error may not be associated with this change.

In a typical high-performance computer system, instructions are pre-fetched from memory so that they are available to the processor for execution as soon as the processor is ready to execute the next instruction. In a typical pre-fetch operation, the system pre-fetches a block of sequential instructions from the system memory into a block of memory that is local to the processor, and therefore immediately available to the processor. When a branch occurs, the previously pre-fetched instructions that sequentially follow the branch instruction in memory are replaced by the instructions from the memory at the specified destination address. This replacement incurs a performance cost while the processor waits for the next instruction from the system memory. Most systems include a "look ahead" capability, wherein the pre-fetch operator looks ahead in the program code being executed to identify the next branch of control. When an unconditional branch is detected, the pre-fetch operator pre-fetches the information from the specified destination-address so that it can provide it to the processor immediately after the branch command is processed. The use of pre-fetching for conditional branch instructions is substantially more complex, because it is unknown whether the next instruction executed after the branch instruction will be the instruction at the destination address or the instruction immediately following the branch instruction. If sufficient local memory is available, segments of instructions from both areas of the system memory are pre-fetched. Alternatively, or in addition to this multiple pre-fetch technique, predictive techniques are often used to pre-fetch the instructions that are likely to be executed. Such predictive techniques are subject to a high degree of variability because in most cases, the state of the condition is virtually unpredictable.

BRIEF SUMMARY OF THE INVENTION

It is an object of this invention to enhance the efficiency of a computer system. It is a further object of this invention to enhance the reliability and maintainability of a program operated on a computer system. It is a further object of this invention to improve the predictive aspects of a pre-fetch system. It is a further object of this invention to ease the task of program development.

These objects, and others, are achieved by providing an architecture that supports the decoupling of parameters typically associated with branch instructions. Branch and call instructions are provided that do not contain an explicit destination address; and, branch, call, and return instructions are provided that do not contain an explicit test condition. In accordance with this invention, the processing system provides a "default" value to any control element in the processor that is not expressly controlled by a particular instruction. In the case of a branch or call instruction, the default destination-address provided to effect the branch or call is the destination-address provided by a prior instruction. Subsequent or alternative branch or call instructions branch to this same address until the default address is set to a different address. In like manner, in most cases, the default condition that is used to determine the result of a conditional test, such as a conditional branch, call, or return instruction, is the last condition specified in a prior instruction. To further support the above objects of this invention, and others, condition-testing can also be effected prior to the execution of conditional instructions. By decoupling the specification of the condition and/or the destination address from the instructions that cause a branch, call, or return, these instructions can be configured to effect other operations, such as modifying registers or memory elements in preparation for processing by the routine to which the program branches or returns. Also, by providing an explicit means for setting a subsequent default destination address and by providing an explicit means for preevaluating a condition flag, program development and maintenance costs can be expected to decrease, and the variability associated with predicting the outcome and destination-address of conditional branches can also be expected to decrease.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions.

DETAILED DESCRIPTION OF THE INVENTION

Figure 1:
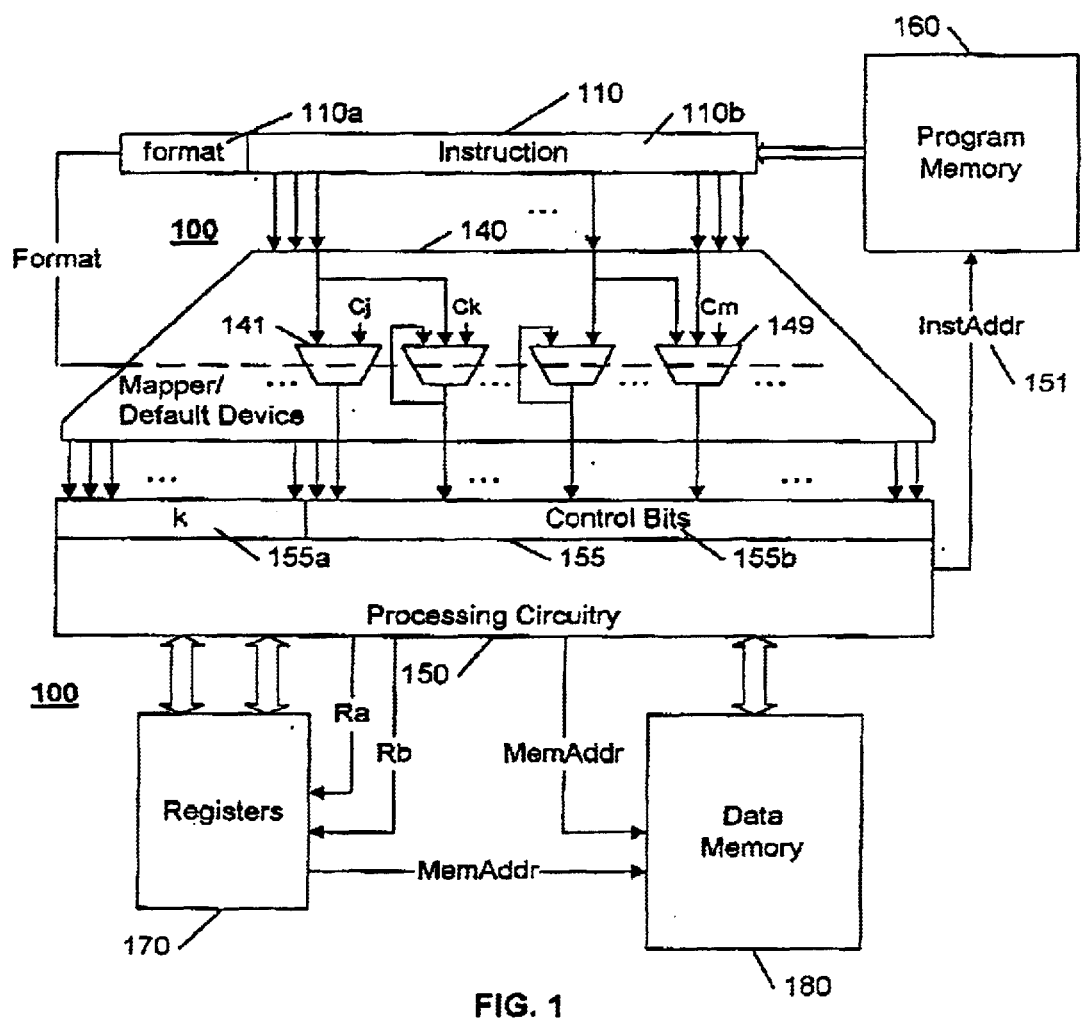
FIG. 1 illustrates an example processing system in accordance with this invention.

FIG. 1 illustrates an example block diagram of a processing system 100 that provides for a decoupling of conditions and destination addresses from branch instructions, in accordance with this invention. One of ordinary skill in the art will recognize, in view of this disclosure, that alternative example embodiments can be defined to effect similar results. In the example of FIG. 1, an instruction 110 is provided from a program memory 160; this instruction is decoded by a mapper/default device 140 to provide a microcode instruction 155 that controls the operation of processing circuitry 150. In response to the microcode instruction 155, the processing circuitry 150 effects desired operations on data contained in registers 170 or memory 180. The processing circuitry 150 also determines each next instruction address 151 at each processing cycle, from which each next instruction 110 is obtained from the program memory 160.

As in a conventional processor, the microcode instruction 155 comprises control bits 155b that control each switch and state device within the processing circuitry 150. That is, for example, the processing circuitry 150 typically comprises a state machine and the microcode instruction 155 provides the input stimuli to this state machine that controls the transition to the next state as well as controlling the production of an output from this state machine. The microcode instruction 155, for example, contains a control bit that will determine whether data will be received from one of the registers 170, whether a location in memory 180 will be written to or read from, and so on. The control bits 155b also determine the operation, such as addition, subtraction, shift, and so on, that will be performed on the data received from the registers 170 or memory 180, and whether other control bits 155b will be affected by the operation. The microcode instruction 155 also includes a "constant" field k 155a. This constant field k 155a is typically used in a variety of applications. The field k 155a may contain, for example, the aforementioned destination-address of a branch or call instruction, in either absolute form, or relative form. The field k 155a may also contain a constant that is used in the aforementioned mathematical operations on the data contained in the registers 170 or memory 180.

In this example embodiment, as in most processor embodiments, there are fewer bits in the instruction 110 than control elements 155a and 155b in the microcode instruction 155. Conventionally, each instruction is formatted to contain sufficient information for effecting that instruction. In particular, in conventional processor designs, a branch or call instruction contains an explicit designation of a destination address, either as an absolute address, or as an offset, or relative address, relative to the current instruction address 151.

In accordance with the principles of this invention, the mapper/default device 140 provides default values for control elements 155a and 155b that are not explicitly controlled by the current instruction 110. In this manner, prior instructions can be configured to specify such items as the destination-address of a branch or call instruction, the condition to be tested for a conditional branch, call, or return instruction, and so on. In effect, because the mapper/default device 140 allows a destination-address from a prior instruction to be saved for use in a subsequent instruction, the mapper/default device 140 comprises a "default-destination-address" register that is accessible by any instruction that does not contain an explicit destination-address. In like manner, the mapper/default device 140 in accordance with this invention provides a "condition" register that is accessible by any instruction that does not contain an explicit condition specification.

Figure 2:
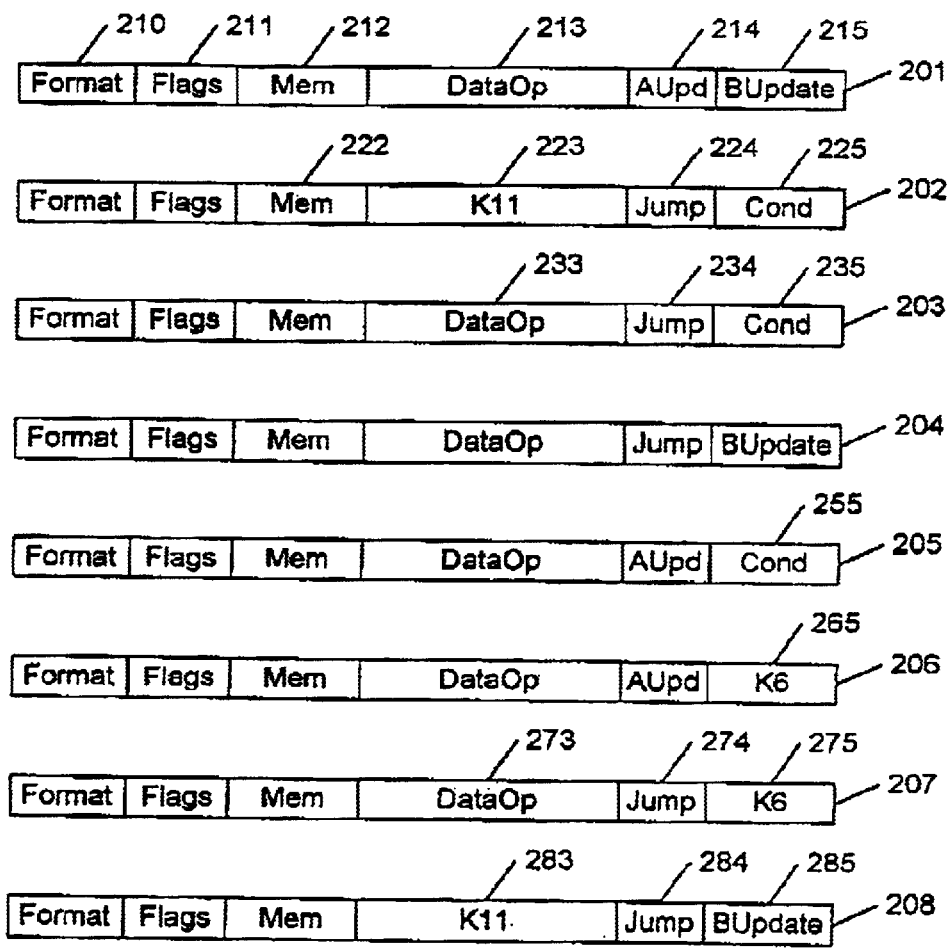
FIG. 2 illustrates an example instruction set format in accordance with this invention.

FIG. 2 illustrates an example of a set of eight different instruction formats 201–208 for se in an example embodiment in accordance with this invention. The format field 210 of each instruction identifies its corresponding format 201–208. Format 201 illustrates an example format that is well suited for data processing operations. Copending U.S. Patent Application "Simple Algorithmic Cryptography Engine", U.S. Ser. No. 09/466,392, filed Dec. 17, 1999, for George Fleming, Farrell Ostler, and Antoine Dagher, incorporated by reference herein, discloses a processing system that allows for multiple operations within a single instruction cycle. Consistent with the referenced patent application, select registers 170 are used to address the memory 180, as illustrated in FIG. 1. The instruction format 201 allows for an addressed memory element to be written to or read from, via the Mem 212 field; it also allows for a variety of arithmetic and logical (shift) operations to be performed on the retrieved memory element, via the DataOp 213 field; and, it allows addressed registers to be updated, such as load, increment, decrement, or shift, via the A-update 214 and B-update 215 fields. That is, in accordance with the referenced patent application, data can be retrieved from memory, operated upon, the result stored in a register, and another register incremented, all in the same instruction 110.

Instruction format 202 corresponds substantially to a conventional branch or call instruction, hereinafter termed a "jump" operation. The field "K11" 223 of the format 202 allows for a constant, in this example, a constant of 11 bits, that is used to specify a destination address. The field "jump" 224 defines the type of jump: call, branch, return, relative, absolute, and so on, and the field "cond" 225 defines the condition, if any, that controls a conditional jump. If the condition is true, the next instruction address (151 in FIG. 1) is the address contained in the K11 field 223, zero extended; otherwise the next instruction address 151 is the next sequential address after the address of the current instruction 110. In accordance with the reference patent application, the instruction format 202 also allows a memory operation (store, retrieve) during the same instruction cycle, via the "mem" 222 field, thereby facilitating, for example, the retrieval of a data item in preparation for the commencement of the routine at the destination-address, or a storage of a data item at the end of a cycle controlled by a conditional branch.

In accordance with this invention, the instruction set includes a format 203 that allows for the inclusion of a jump 234 field without an explicit specification of a destination-address. By allowing a jump without an explicit specification of a destination-address, the instruction can contain other operations, such as the DataOp 233 field that controls the operation on data items, as discussed above with regard to the DataOp 213 field. By providing the DataOp 233 field in the same instruction that includes a jump 234 field, a new data value can be computed as a preparation for the procedure being jumped to via the field 234, or, for example, a function value can be computed and stored in the memory 180 (FIG. 1) upon a return jump from a subroutine.

The format 204 provides additional capabilities in parallel with a jump operation. As illustrated, the format 204 includes a B-update 245 field, similar to the B-update 215 field, in lieu of a condition field. This allows a select register to be updated in parallel with a jump operation. In addition to preparing a data item for the subsequent jump, or storing a computed data item upon return from a subroutine, this update field 245 can be used, for example, to increment a loop index during the same instruction that branches back to the start of the loop. Additional uses of the availability of parallel operations with a jump command, as provided by the decoupling of the destination-address and/or the condition tests from the jump command, will be evident to one of ordinary skill in the art in view of this disclosure.

Formats 205–208 are further variations of this decoupling. In instruction 205, a condition field 255 is provided, without a corresponding jump field. In this manner, the default-condition can be specified that controls all subsequent jump operations, until another instruction 202, 203, 205 resets the default-condition. In formats 206, 207, and 28, a constant field 265, 275, 283 is provided that can be used to specify a default destination-address for subsequent jump operations. Depending upon the particular convention utilized, these constant fields can be utilized to provide either an absolute address, or a relative address. In accordance with this invention, the default destination-address that is specified by each of the fields 223, 265, 275, 283 control the destination of all subsequent jump operations, in conjunction with other fields, until the default destination-address is changed by another instruction 202, 206, 207, 208. Format 207 provides a jump 274 field and the constant field 275 that sets the default destination-address, but the condition that controls the jump is not specified. In each of the formats 203–208, the decoupling of the jump, condition, and address fields allows one or more other fields, such as the above described Data-Op 213 field, the A-update 214, and B-update 215 field, to be included in the instruction, to optimize the number of instructions required to effect a task, and/or to optimize the speed of execution of the task, by allowing for a variety of parallel operations in each instruction.

The illustrated mapper/default device 140 of FIG. 1 provides an example embodiment of an instruction processing technique to support the above decoupled operations. As illustrated in FIG. 1, each bit of the instruction 110 is mapped to a corresponding control element in the microcode instruction 155. The mapper/default device 140 comprises a plurality of selectors 141–149 that route each bit of the control field 110b to a corresponding control bit 155b, depending upon the given format 110a of the instruction 110. The mapper/default device 140 routes the different fields from the same bit position of an instruction 110 to different control elements 155a, 155b of the microcode instruction 155, depending upon the format 110a of the instruction 110. The mapper/default device 140 also appropriately controls the other control elements of the microcode instruction 155, those that are not controlled via the mapping from the instruction 110, by providing default control values for each control element 155a, 155b of the microcode instruction 155 (e.g., control values Cj, Ck and Cm illustrated in FIG. 1). That is, for example, the example instruction formats 201, 203 do not include a constant field for setting the value of k 155a in the microcode instruction 155. The default interpretation for the absence of a specified constant field in an instruction 110 in a preferred embodiment is a null operation. That is, in the absence of a specified constant value, the value k 155a remains the same. Alternatively, as illustrated in format 206 of FIG. 2, when a short, 6-bit value of k is provided in a field K6 265, the default value for the k 155a control element is a sign-extended value of the K6 265 field. A subsequent relative jump operation, via, for example, the jump 234 field of format 203, can use this signed value k 155a to compute a destination-address by adding this value k 155a to the current instruction address 151.

In a preferred embodiment, the output of the multiplexer/selector 141–149 associated with each control element 155 is dependent upon the content of the format field 210, and the inputs are dependent upon the available default options. The choice of a default value or condition for each control element 155a, 155b of the microcode instruction 155 can be any value or condition, but in a preferred embodiment, the default values and conditions are chosen to be those that would be consistent with an assumed value by one of ordinary skill in the art. That is, for example, the zero-ing of higher order bits when a data constant K11 223 is provided, and the sign-extension of higher order bits when a shorter constant K6 265 is provided, would be assumed to be proper defaults by one of ordinary skill in the art. In like manner, the default condition of the set of control bits corresponding to the absence of a jump 234 field would be assumed to correspond to an advancement of the program counter by one instruction. That is, when an instruction having a format 201 is received, which does not contain a jump 234 field, the default interpretation module 140 sets the appropriate control elements in the macroinstruction 155 corresponding to the absent field 234 such that the corresponding selectors within the set 141–149 are set to select the appropriate inputs to effect an increment of the next-instruction-address 151, thereby providing a consistent, predictable, and logical effect in the absence of an explicit instruction field.

In accordance with another aspect of this invention, the flags 211 field includes control bits that further facilitate the use of decoupled jump instructions. As is common in the art of processing systems, the processing circuitry includes a set of "status flags" that represent the result of particular operations. These status flags include, for example, a "zero" flag that is asserted when the result of a mathematical operation is zero, a "carry" flag that is asserted when the result of a mathematical operation produces an overflow, and so on. One of the flag 211 bits is an "update flags" control bit that effects a preservation of the determined flag values until a subsequent instruction is executed that also has this control bit set. In this manner, when a condition, such as "Branch if Carry" is executed, its result will be determined by the flag that was updated in a prior instruction.

Another control bit in the flags 211 field saves a result of a condition-test into a "saved condition" register, for subsequent use in a conditional jump instruction. The example formats 202, 203, and 205, for example, includes a condition field, 225, 235, and 255, respectively. The condition field 225, 235, 255 contains a specification of the particular condition to test, such as whether the zero flag is set, the carry flag is set, and so on. If the "save condition" control bit is set, the result of the tested condition is saved into the "saved condition" register, for subsequent use in a conditional jump instruction. In a preferred embodiment, whenever the "save condition" control bit is set, the default control bits 155b that control the selection of the condition to utilize for a conditional jump instruction are set to select this "saved condition" register.

By providing one or more flags that maintain their state through other changes of the processor's state, a number of advantages can be realized. As mentioned above, the likelihood of an inadvertent modification of a condition flag during a program update is reduced, because in a preferred embodiment, an explicit setting of the "update flags" or "save condition" control bits in an instruction is required to modify the persistent flag(s). Also, the predetermination of the condition for a conditional branch allows for a highly effective pre-fetch operation, because it is highly likely, and often determinable, that the persistent condition flag will not change before the conditional branch is executed. The presetting of a persistent flag also allows the data item(s) upon which the condition of the flag is set to change as required without affecting the subsequent conditional instructions.

The foregoing merely illustrates the principles of the invention. It will thus be appreciated that those skilled in the art will be able to devise various arrangements which, although not explicitly described or shown herein, embody the principles of the invention and are thus within its spirit and scope. For example, the principles of this invention can also be effected by providing a separate "destination-address register" that is configured to hold the default destination address, independent of the particular processor architecture utilized. That is, although a microcode and state machine architecture is presented herein as a suitable embodiment to utilize decoupled control conditions, the principles presented herein can be embodied in any processor architecture by including specific devices for storing the decoupled information. These and other system configuration and optimization features will be evident to one of ordinary skill in the art in view of this disclosure, and are included within the scope of the following claims.

What is claimed is:

1. A processing system, comprising:

a device operable to decode a first program instruction into a first microcode instruction, said device further operable to decode a second program instruction into a second microcode instruction;

a circuit in electrical communication with said device, said circuit operable to process the first microcode instruction subsequent to a first decoding of the first program instruction by said device, said circuit further operable to process the second microcode instruction subsequent to a second decoding of the second program instruction by said device and a first processing of the first microcode instruction by said circuit;

wherein the first program instruction includes a first field defining a first jump type to be decoded by said device;

wherein the first program instruction further includes a second field defining a first destination address to be decoded by said device;

wherein the first program instruction further includes a fifth field defining a first jump condition to be decoded by said device;

wherein the second program instruction includes a third field defining a second jump type to be decoded by said device; and wherein a fourth field defines a second destination address to be decoded by said device, and the second program instruction excludes the fourth field, wherein a sixth field defines a second jump condition to be decoded by said device, and the second program instruction excludes the sixth field, wherein said device is further operable to store the first jump condition as a default-condition as a result of the first decoding of the first program instruction by said device; and wherein said device is further operable to include the first jump condition in the second microcode instruction as a result of the second decoding of the second program instruction by said device.

2. The processing system of claim 1, wherein said device is further operable to store the first destination address as a default-destination-address as a result of the first decoding of the first program instruction by said device; and wherein said device is further operable to include the first destination address in the second microcode instruction as a result of the second decoding of the second program instruction by said device.

3. The processing system of claim 1, wherein said device is further operable to decode a third program instruction into a third microcode instruction;

wherein said circuit is further operable to process the third microcode instruction subsequent to the first processing of the first microcode instruction by said circuit, prior to the second decoding of the second program instruction by said device and subsequent to a third decoding of the third program instruction by said device;

wherein the third program instruction includes a fifth field defining a first jump condition to be decoded by said device;

wherein a sixth field defines a second jump condition to be decoded by said device, and the second program instruction excludes the sixth field.

4. The processing system of claim 3, wherein said device is further operable to store the first jump condition as a default-condition as a result of the third decoding of the third program instruction by said device; and wherein said device is further operable to include the first jump condition in the second microcode instruction as a result of the second decoding of the second program instruction by said device.

5. The processing system of claim 1, wherein the first jump type is one of a branch instruction or a call instruction.

6. The processing system of claim 1, wherein the second jump type is one of a branch instruction or a call instruction.

7. A processing system, comprising:

a device operable to decode a first program instruction into a first microcode instruction, said device further operable to decode a second program instruction into a second microcode instruction;

a circuit in electrical communication with said device, said circuit operable to process the first microcode instruction subsequent to a first decoding of the first program instruction by said device, said circuit further operable to process the second microcode instruction subsequent to a second decoding of the second program instruction by said device and a first processing of the first microcode instruction by said circuit;

wherein the first program instruction includes a first field defining a first jump type to be decoded by said device;

wherein the first program instruction further includes a second field defining a first jump condition to be decoded by said device;

wherein the second program instruction includes a third field defining a second jump type to be decoded by said device; and wherein a fourth field defines a second jump condition to be decoded by said device, and the second program instruction excludes the fourth field;

wherein said device is further operable to store the first jump condition as a default-condition as a result of the first decoding of the first program instruction by said device; and wherein said device is further operable to include the first jump condition in the second microcode instruction as a result of the second decoding of the second program instruction by said device.

8. The processing system of claim 7, wherein the first jump type is one of a branch instruction or a call instruction.

9. The processing system of claim 7, wherein the second jump type is one of a branch instruction or a call instruction.

10. A processing system, comprising:

a device operable to decode a first program instruction into a first microcode instruction, said device further operable to decode a second program instruction into a second microcode instruction;

a circuit in electrical communication with said device, said circuit operable to process the first microcode instruction subsequent to a first decoding of the first program instruction by said device, said circuit further operable to process the second microcode instruction subsequent to a second decoding of the second program instruction by said device and a first processing of the first microcode instruction by said circuit;

wherein the first program instruction further includes a first field defining a first destination address to be decoded by said device;

wherein the second program instruction includes a second field defining a jump type to be decoded by said device; and wherein the second program instruction excludes a fourth field defining a jump condition to be decoded by said device;

wherein a third field defines a second destination address to be decoded by said device, and the second program instruction excludes the third field; and wherein said device is further operable to include the jump condition in the second microcode instruction as a result of the second decoding of the second program instruction by said device; and wherein said device is further operable to store the first destination address as a default-destination-address as a result of the first decoding of the first program instruction by said device; and wherein said device is further operable to include the first destination address in the second microcode instruction as a result of the second decoding of the second program instruction by said device.

11. The processing system of claim 10, wherein the jump type is one of a branch instruction or a call instruction.

12. A processing system, comprising:

a device operable to decode a first program instruction into a first microcode instruction, said device further operable to decode a second program instruction into a second microcode instruction;

a circuit in electrical communication with said device, said circuit operable to process the first microcode instruction subsequent to a first decoding of the first program instruction by said device, said circuit further operable to process the second microcode instruction subsequent to a second decoding of the second program instruction by said device and an first processing of the first microcode instruction by said circuit;

wherein the first program instruction further includes a first field defining a first jump condition to be decoded by said device;

wherein the second program instruction includes a second field defining a jump type to be decoded by said device;

wherein said device is further operable to store the first jump condition as a default-condition as a result of the first decoding of the first program instruction by said device; and wherein said device is further operable to include the first jump condition in the second microcode instruction as a result of the second decoding of the second program instruction by said device.

13. The processing system of claim 12,
wherein the second program instruction excludes a fourth field defining a destination address to be decoded by said device; and
wherein said device is further operable to include the destination address in the second microcode instruction as a result of the second decoding of the second program instruction by said device.

14. The processing system of claim 12,
wherein the jump type is one of a branch instruction or a call instruction.

* * * * *